United States Patent
Kao et al.

(10) Patent No.: US 10,774,225 B2
(45) Date of Patent: Sep. 15, 2020

(54) COATING COMPOSITION

(71) Applicant: Dow Global Technologies LLC, Midland, MI (US)

(72) Inventors: Joseph Kao, Freeport, TX (US); Yuanqiao Rao, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 17 days.

(21) Appl. No.: 15/761,231

(22) PCT Filed: Oct. 13, 2016

(86) PCT No.: PCT/US2016/056782
§ 371 (c)(1),
(2) Date: Mar. 19, 2018

(87) PCT Pub. No.: WO2017/066410
PCT Pub. Date: Apr. 20, 2017

(65) Prior Publication Data
US 2018/0265716 A1 Sep. 20, 2018

Related U.S. Application Data

(60) Provisional application No. 62/241,355, filed on Oct. 14, 2015.

(51) Int. Cl.
| | |
|---|---|
| *C09D 7/61* | (2018.01) |
| *C09D 4/00* | (2006.01) |
| *C09D 7/40* | (2018.01) |
| *C08F 222/10* | (2006.01) |
| *C09D 5/00* | (2006.01) |
| *C08K 3/22* | (2006.01) |

(52) U.S. Cl.
CPC .......... *C09D 7/61* (2018.01); *C08F 222/1006* (2013.01); *C09D 4/00* (2013.01); *C09D 5/00* (2013.01); *C09D 7/67* (2018.01); *C08K 2003/2244* (2013.01); *C08K 2201/003* (2013.01)

(58) Field of Classification Search
None
See application file for complete search history.

(56) References Cited

U.S. PATENT DOCUMENTS

| | | | |
|---|---|---|---|
| 7,985,476 | B2 | 7/2011 | Kurino et al. |
| 8,754,145 | B1 | 6/2014 | Haubrich et al. |
| 8,883,903 | B2 | 11/2014 | Williams et al. |
| 8,920,675 | B2 | 12/2014 | Xu et al. |
| 2012/0088845 | A1 | 4/2012 | Williams et al. |
| 2014/0322549 | A1 | 10/2014 | Xu et al. |

FOREIGN PATENT DOCUMENTS

WO    WO 2015/006087 A1  *  1/2015

OTHER PUBLICATIONS

Kopesky et al, "Miscibility and viscoelastic properties of acrylic polyhedral oligomeric silsesquioxane-poly(methyl methacrylate) blends", Polymer, 2005, pp. 4743-4752, vol. 46.
Kudo, et al, "Optically transparent and refractive index-tunable ZrO2/photopolymer composites designed for ultraviolet nanoimprinting", Japanese Journal of Applied Physics, 2011, pp. 06GK12-1-06GK12-7, vol. 50.
Kim, "Photo-nanoimprint lithography for nanopatterning technology", Journal of the Korean Physical Society, Nov. 2004, pp. 1233-1235, vol. 45, No. 5.
Minami, et al,"The production of polyacrylate film containing nanoparticles of zirconia and its optical features", Kobunshi Ronbunshu, Jul. 2010, pp. 397-402, vol. 67, No. 7.
Search report for corresponding China Application No. 201680057603.2 dated Nov. 19, 2029.
Search report for corresponding China Application No. 201680057603.2 dated Oct. 25, 2019.

* cited by examiner

*Primary Examiner* — Ana L. Woodward
(74) *Attorney, Agent, or Firm* — G. Preston Campbell

(57) ABSTRACT

Provided is a coating composition comprising (a) a matrix mixture, comprising (i) one or more urethane multi(meth)acrylates (ii) one or more non-urethane multi(meth)acrylates (iii) optionally one or more mono(meth)acrylates (iv) one or more initiators; (b) zirconia,; and wherein the weight ratio of (a) to (b) is from 0.06:1 to 2.8:1, and wherein the amount of (a) plus the amount of (b) is 1% to 100% by weight based on the weight of said coating composition. Also provided is a coated article formed by a process comprising (A) applying a layer of the coating composition to a surface of a substrate, (B) removing said solvent from said layer of the coating composition, and (C) curing, or allowing to cure, said layer of the coating composition.

8 Claims, No Drawings

COATING COMPOSITION

It is sometimes desired to improve the hardness of a surface. For example, it is sometimes desired to use a plastic sheet as the surface of the display screen of an electronic device. The plastic sheet could provide flexibility but may be prone to damage by scratching or indentation.

US Patent Application Publication 2010/0322549 describes a coating that contains metal oxide nanocrystals and a mixture of acrylate monomers and oligomers. It is desired to provide a coating that has improved hardness while maintaining desirably high elastic modulus, elongation, and transparency.

The following is a statement of the invention.

A first aspect of the present invention is a coating composition comprising
  (a) a matrix mixture, by weight based on the weight of said coating composition, wherein said matrix mixture comprises
    (i) 30% to 95% one or more urethane multi(meth)acrylates, by weight based on the weight of said matrix mixture;
    (ii) 4% to 50% one or more non-urethane multi(meth)acrylates, by weight based on the weight of said matrix mixture;
    (iii) 0 to 35% one or more mono(meth)acrylates, by weight based on the weight of said matrix mixture;
    (iv) 1% to 10% one or more initiators, by weight based on the weight of said matrix mixture;
  (b) zirconia, by weight based on the weight of said coating composition,
    (i) wherein said zirconia is in the form of a collection of zirconia particles having number-average diameter of 100 nm or less;
    (ii) wherein said collection of zirconia particles has a distribution of diameters that has a breadth parameter (BP) defined by $$BP = N75 - N25$$

of 5 nm or less; and
  wherein the weight ratio of (a) to (b) is from 0.06:1 to 2.8:1, and wherein the amount of (a) plus the amount of (b) is 1% to 100% by weight based on the weight of said coating composition.

A second aspect of the present invention is a coated article formed by a process comprising
  (A) applying a layer of the coating composition of the first aspect to a surface of a substrate,
  (B) removing said solvent from said layer of the coating composition of claim 1, and
  (C) curing, or allowing to cure, said layer of the coating composition of claim 1.

The following is a detailed description of the invention.

As used herein, the following terms have the designated definitions, unless the context clearly indicates otherwise.

A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Molecules that can react with each other to form the repeat units of a polymer are known herein as "monomers." The repeat units so formed are known herein as "polymerized units" of the monomer.

Vinyl monomers have the structure I:

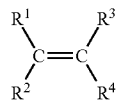

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof, and the carbon-carbon double bond is capable of participation in a vinyl polymerization reaction.

Vinyl monomers include, for example, styrene, substituted styrenes, dienes, ethylene, other alkenes, dienes, ethylene derivatives, and mixtures thereof. Ethylene derivatives include, for example, unsubstituted or substituted versions of the following: ethenyl esters of substituted or unsubstituted alkanoic acids (including, for example, vinyl acetate and vinyl neodecanoate), acrylonitrile, (meth)acrylic acids, (meth)acrylates, (meth)acrylamides, vinyl chloride, halogenated alkenes, and mixtures thereof. As used herein, "(meth)acryl-" means "acryl-" or "methacryl-." "Substituted" means having at least one attached chemical group such as, for example, alkyl group, alkenyl group, vinyl group, hydroxyl group, carboxylic acid group, other functional groups, and combinations thereof. Substituted monomers include, for example, monomers with more than one carbon-carbon double bond, monomers with hydroxyl groups, monomers with other functional groups, and monomers with combinations of functional groups.

(Meth)acrylates are vinyl monomers that have one or more chemical groups of structure II

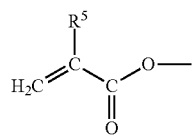

where $R^5$ is hydrogen or methyl. A monomer having exactly one group of structure II is a mono(meth)acrylate, and a monomer having two or more groups of structure II is a multi(meth)acrylate. A urethane (meth)acrylate is a (meth)acrylate that contains one or more urethane linkages. A urethane linkage is a bivalent chemical group of structure III

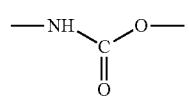

A urethane (meth)acrylate having two or more groups of structure II is a urethane multi(meth)acrylate. A (meth)acrylate that contains no groups of structure III is a non-urethane (meth)acrylate.

A polyol is a compound having two or more hydroxyl groups. An alkane polyol is a polyol in which two or more hydroxyl groups are attached to an alkyl group that, aside from the hydroxyl groups, has no other substituents. The alkyl group may be linear, branched, cyclic, or a combination thereof.

An initiator is a molecule that is stable at 25° C. under ordinary conditions but that, under the correct stimulus, produces one or more radical species that are capable of initiating a radical polymerization process. Initiators include thermal initiators, which produce one or more radical species when heated above room temperature, and photoinitiators, which produce one or more radical species when exposed to radiation of shorter wavelength than visible light or when exposed to electron beams. Initiators also include redox initiators, which are pairs of molecules that are stable at room temperature when stored separately from each other but that produce one or more radical species when they are mixed together.

As used herein, an organic solvent is a carbon-containing compound that is liquid over a temperature range that includes 18° C. to 25° C. Organic solvent is not a vinyl monomer.

Zirconia is $ZrO_2$. As used herein, the term "zirconia" includes zirconia in the form of particles of zirconia in which the surface has been chemically modified. Alumina is $Al_2O_3$.

A collection of particles is characterized herein by the "particle size," which is the average diameter of the particles. A non-spherical particle is considered to have the diameter that a sphere of the same volume would have. Particle size is measured by forming a dispersion of 0.1% by weight particles in solvent, casting a film on a grid suitable for transmission electron microscopy (TEM), allowing the film to dry, obtaining an image of the film by TEM, then analyzing the image to determine distribution of particle diameters. The average diameter is the number-average diameter.

The breadth of the distribution of particle diameters characterized herein as follows. The diameter N25 is the diameter such that 25% of the particles, by number of particles, have diameter of N25 or below, while 75% of the particles, by number of particles, have diameter above N25. Similarly, N75 is the diameter such that 75% of the particles, by number of particles, have diameter of N75 or below, while 25% of the particles, by number of particles, have diameter above N75. The breadth of the distribution is characterized herein as the result of the arithmetical subtraction N75–N25.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when a ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

The composition of the present invention contains a matrix mixture. The matrix mixture contains monomers and one or more initiators and is a liquid at 25° C. Preferably, the monomers are soluble in each other at 25° C. in the proportions present in the matrix mixture. Preferably, the initiator is soluble in the matrix mixture at 25° C. in the proportions present in the matrix mixture.

The matrix mixture contains one or more urethane multi(meth)acrylates. Preferred urethane multi(meth)acrylates have a structure described as follows. An unsubstituted alkyl group (which may be linear, branched, cyclic, or a combination thereof), called the "central" alkyl group, is attached to two or more groups of structure III, such that, for each group of structure III, the N atom of the group of structure III is bonded to a carbon atom of the central alkyl group. In each group of structure III, the non-carbonyl O atom is bonded to a carbon atom of an alkyl group having two or more carbon atoms (which may be linear, branched, cyclic, or a combination thereof), called a "peripheral" alkyl group. In each peripheral alkyl group, a carbon atom that is not bonded to a group of structure III is bonded to the non-carbonyl O atom of a group of structure II.

Preferred urethane multi(meth)acrylates have exactly two groups of structure II. Preferred urethane multi(meth)acrylates have structure IV

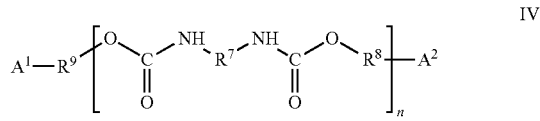

where n is 1 or more; $A^1$ and $A^2$ each independently has structure II; and $R^7$, $R^8$, and $R^9$ is each independently a bivalent organic group having one or more carbon atoms. Preferably, in $A^1$ or $A^2$ or both, $R^5$ is methyl. Preferably, $A^1$ and $A^2$ are the same as each other. Preferably $R^9$ is an unsubstituted alkyl group; more preferably an unsubstituted alkyl group having 2 to 20 carbon atoms; more preferably 2 to 8 carbon atoms; more preferably 2 to 4 carbon atoms; more preferably $R^9$ is —$CH_2CH_2$—. If n is more than 1, each $R^8$ group may be chosen independently of the other $R^8$ groups. Preferably, each $R^8$ is an unsubstituted alkyl group; more preferably an unsubstituted alkyl group having 2 to 20 carbon atoms; more preferably 2 to 8 carbon atoms; more preferably 2 to 4 carbon atoms; more preferably $R^8$ is —$CH_2CH_2$—. Preferably all the $R^8$ groups are the same as each other. Preferably $R^9$ is the same as $R^8$. Preferably, n is 1 to 200; more preferably 1 to 100; more preferably 1 to 30; more preferably 1 to 10; more preferably 1 to 3; more preferably 1. Preferably $R^7$ is an unsubstituted alkyl group having 2 or more carbon atoms; more preferably 4 or more carbon atoms; more preferably 8 or more carbon atoms. Preferably $R^7$ is an unsubstituted alkyl group having 18 or fewer carbon atoms; more preferably 16 or fewer carbon atoms; more preferably 14 or fewer carbon atoms; more preferably 12 or fewer carbon atoms; more preferably 10 or fewer carbon atoms.

Preferably, the amount of urethane multi(meth)acrylate is, by weight based on the weight of the matrix mixture, 35% or more; more preferably 40% or more; more preferably 45% or more. Preferably, the amount of urethane multi (meth)acrylate is, by weight based on the weight of the matrix mixture, 90% or less; more preferably 80% or less; more preferably 75% or less; more preferably 70% or less.

The matrix mixture additionally contains one or more non-urethane multi(meth)acrylates, which has two or more groups having structure II. Preferred non-urethane multi (meth) acrylates have 3 or more groups having structure II. Preferably, in one or more of the groups having structure II, $R^5$ is hydrogen; more preferably, in all of the groups having structure II, $R^5$ is hydrogen. Preferably, the number of groups having structure II is 6 or less; more preferably 5 or less; more preferably 4 or less; more preferably 3.

Preferred non-urethane multi(meth)acrylates have molecular weight of 1,500 or less; more preferably 1,000 or less; more preferably 500 or less. Preferred non-urethane multi(meth)acrylates have the structure that would be formed if two or more of the hydroxyl groups on an alkane polyol formed ester linkages with acrylic acid or methacrylic acid.

Among suitable non-urethane multi(meth)acrylates are POSS multi(meth)acrylates. A POSS is a polyhedral oligomeric silsequioxane. POSS has a cage structure $R_xT_x$, where R is an organic group on each corner and T is the silsequinoxane linkage, which has the formula $SiO_{1.5}$. A POSS multi(meth)acrylate is a POSS in which pendant groups are attached to POSS, and two or more of the pendant groups contain a group having structure II.

Preferably, the amount of non-urethane multi(meth)acrylate is, by weight based on the weight of the matrix mixture, 15% or more; more preferably 20% or more; more preferably 25% or more. Preferably, the amount of non-urethane multi(meth)acrylate is, by weight based on the weight of the matrix mixture, 60% or less; more preferably 50% or less; more preferably 40% or less.

The matrix mixture optionally contains one or more mono(meth)acrylates. Among mono(meth)acrylates, preferred are non-urethane mono(meth)acrylates. Preferred non-urethane mono(meth)acrylates are alkyl esters of (meth) acrylic acid, where the alkyl group is unsubstituted. The alkyl group may be linear, branched, cyclic, or a combination thereof. Preferably the amount of mono(meth)acrylate is, by weight based on the weight of the matrix mixture, 0-15%; more preferably 0-10%; more preferably 0-8%; more preferably 0-5%; more preferably 0-2%; more preferably 0-1%; more preferably 0%.

The matrix mixture contains one or more initiators. Preferred initiators are photoinitiators. Among photoinitiators, preferred are photoinitiators drawn from one or more of the following categories: benzoin ethers, benzil ketals, α-dialkoxy-acetophenones, α-hydroxy-alkyl-phenones, α-amino alkylphenones, acyl-phosphine oxides, and mixtures thereof; more preferred are α-hydroxy alkyl phenones, acyl-phosphine oxides, and mixtures thereof.

Preferably the amount of initiator is, by weight based on the weight of the matrix mixture, 2% or more; more preferably 3% or more; more preferably 4% or more. Preferably the amount of initiator is, by weight based on the weight of the matrix mixture, 8% or less; more preferably 6% or less.

The coating composition optionally contains one or more organic solvents. Preferred are solvents having one or more oxygen atoms; more preferred are solvents having exactly one oxygen atom and no atoms other than oxygen, hydrogen, and carbon. More preferred are dialkyl ketones, where the two alkyl groups may be independently linear, branched, cyclic, or a combination thereof. Preferably, the two alkyl groups are unsubstituted. The two alkyl groups may be the same as each other or different from each other. Preferred are methyl ethyl ketone (MEK), methyl isobutyl ketone (MIBK), and mixtures thereof. In some embodiments, no organic solvent is present.

Preferably, the coating composition either contains no compound having any fluorine atoms or else, if any compounds having one or more fluorine atoms are present, the amount of all compounds having one or more fluorine atoms is, by weight based on the weight of coating composition, 1% or less; more preferably 0.1% or less. More preferably, the coating composition contains no compound having any fluorine atoms. Preferably, the coating composition either contains no compound having any halogen atoms or else, if any compounds having one or more halogen atoms are present, the amount of all compounds having one or more halogen atoms is, by weight based on the weight of coating composition, 1% or less; more preferably 0.1% or less. More preferably, the coating composition contains no compound having any halogen atoms.

The coating composition of the present invention contains zirconia in the form of a collection of particles. Preferably, the average diameter in the collection of zirconia particles is 75 nm or less; more preferably 50 nm or less; more preferably 25 nm or less; more preferably 10 nm or less; more preferably 7 nm or less. Preferably, the average diameter in the collection of zirconia particles is 0.3 nm or more; more preferably 1 nm or more.

Preferably the breadth of the distribution of diameters of zirconia particles, as characterized by breadth parameter BP=(N75–N25), is 4 nm or less; more preferably 3 nm or less; more preferably 2 nm or less. Preferably the breadth of the distribution of diameters of zirconia particles, as characterized by BP=(N75–N25), is 0.01 or more. It is useful to consider the quotient W as follows:

$$W=(N75-N25)/Dm$$

where Dm is the number-average diameter. Preferably W is 1.0 or less; more preferably 0.8 or less; more preferably 0.6 or less; more preferably 0.5 or less; more preferably 0.4 or less. Preferably W is 0.05 or more.

Preferably, the zirconia particles have surfaces modified by attachment of one or more organic compounds. The surface modification may be made during the manufacture of the zirconia particles, or organic molecules attached to the surfaces during manufacture may be replaced at a later time by replacing those organic molecules with different organic molecules. Alternatively, zirconia particles that are manufactured without surface modification may be modified after manufacture. Surface modification is characterized herein by the compound or compounds attached to the zirconia surface.

Preferred surface-modification compounds are organosilanes, organoalcohols, organocarboxylic acids, and mixtures thereof. More preferred are organocarboxylic acids.

Among organosilanes, preferred are organosilanes with structure V

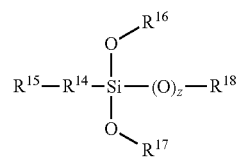

where z is 0 or 1; $R^{14}$ is absent or is an organic chemical group; and each of $R^{15}$, $R^{16}$, $R^{17}$, and $R^{18}$, is, independently of each other, H or an organic chemical group. Preferably $R^{14}$ is absent or is a group having the structure —$(R^{19}O)_x$—$R^{20}$, where x is 1 to 100, $R^{19}$ is an unsubstituted alkyl group having 1 or 2 carbon atoms, preferably 1 carbon atom, and $R^{20}$ is an unsubstituted alkyl group, preferably an unsubstituted alkyl group having 4 or fewer carbon atoms. Preferably $R^{15}$ is an unsubstituted alkyl group or a (meth) acrylate group, more preferably a (meth)acrylate group. When $R^{15}$ is an unsubstituted alkyl group, preferred are unsubstituted alkyl groups of 3 to 8 carbon atoms. When $R^{15}$ is a (meth)acrylate group, preferred is methacrylate group. Preferably, $R^{16}$ is an unsubstituted alkyl group, preferably an unsubstituted alkyl group having 1 to 4 carbon atoms; more preferably 1 or 2 carbon atoms. Preferably, $R^{17}$ is an unsubstituted alkyl group, preferably an unsubstituted alkyl group having 1 to 4 carbon atoms; more preferably 1 or 2 carbon atoms. Preferably, $R^{18}$ is an unsubstituted alkyl group, preferably an unsubstituted alkyl group having 1 to 4 carbon atoms; more preferably 1 or 2 carbon atoms.

Among organosilanes, some suitable compounds are alkyltrialkoxysilanes, alkoxy(polyalkyleneoxy)alkyltrialkoxysilanes, substituted-alkyltrialkoxysilanes, phenyltrialkoxysilanes, and mixtures thereof. For example, some suitable oranosilanes are n-propyltrimethoxysilane, n-propyltriethoxysilane, n-octyltrimethoxysilane, n-octyltriethoxysilane, phenyltrimethoxysilane, 2-[methoxy(polyethyleneoxy)propyl]-trimethoxysilane, methoxy(triethyleneoxy)propyltrimethoxysilane, 3-aminopropyltrimethoxysilane, 3-mercaptopropyltrimethoxysilane, 3-(methacryloyloxy)propyl trimethoxysilane, 3-isocyanatopropyltriethoxysilane, 3-isocyanatopropyltrimethoxysilane, glycidoxypropyltrimethoxysilane, and mixtures thereof.

Among organoalcohols, preferred are alcohols or mixtures of alcohols of the formula $R^{10}OH$, where $R^{10}$ is an aliphatic group, an aromatic-substituted alkyl group, an aromatic group, or an alkylalkoxy group. More preferred organoalcohols are ethanol, propanol, butanol, hexanol, heptanol, octanol, dodecyl alcohol, octadecanol, benzyl alcohol, phenol, oleyl alcohol, triethylene glycol monomethyl ether, and mixtures thereof.

Among organocarboxylic acids, preferred are carboxylic acids of formula $R^{11}COOH$, where $R^{11}$ is an aliphatic group, an aromatic group, a polyalkoxy group, or a mixture thereof. Among organocarboxylic acids in which $R^{11}$ is an aliphatic group, preferred aliphatic groups are methyl, propyl, octyl, oleyl, and mixtures thereof. Among organocarboxylic acids in which $R^{11}$ is an aromatic group, the preferred aromatic group is $C_6H_5$. Preferably $R^{11}$ is a polyalkoxy group. When $R^{11}$ is a polyalkoxy group, $R^{11}$ is a linear string of alkoxy units, where the alkyl group in each unit may be the same or different from the alkyl groups in other units. Among organocarboxylic acids in which $R^{11}$ is a polyalkoxy group, preferred alkoxy units are methoxy, ethoxy, and combinations thereof. Among organocarboxylic acids in which $R^{11}$ is a polyalkoxy group, preferably $R^{11}$ has structure VI $$R^{12}-(R^{13}O)_m-COOH \quad\quad VI$$

where m is 1 or more; preferably m is 2 or more. Preferably n is 10 or less; more preferably 5 or less; more preferably 3 or less. $R^{12}$ and $R^{13}$ are alkyl groups; $R^{12}$ and $R^{13}$ may be the same as each other or different. If n is 2 or greater, the various $R^{13}$ groups may be the same as each other or different. Preferably $R^{12}$ and each $R^{13}$ is either ethyl or methyl, where $R^{12}$ and each $R^{13}$ may be chose independently of each other. A preferred organocarboxylic acid is 2-[2-(2-methoxyethoxy)ethoxy] acetic acid.

Preferably the weight ratio of the amount of matrix mixture to the amount of zirconia is 0.06:1 or higher; more preferably 0.1:1 or higher; more preferably 0.15:1 or higher; more preferably 0.2:1 or higher. Preferably the weight ratio of the amount of matrix mixture to the amount of zirconia is 2.8:1 or lower; more preferably 2:1 or lower; more preferably 1.5:1 or lower; more preferably 1:1 or lower; more preferably 0.5:1 or lower.

In some cases, zirconia is supplied by the manufacturer as a dispersion in an ether type solvent such as, for example, propylene glycol methyl ether acetate (PGMEA). Ether type solvents contain an ether linkage —O— that connects two carbon atoms. Preferably, ether type solvents are removed from the zirconia by evaporation, more preferably by evaporation under pressure less than 1 atmosphere.

The amount of matrix mixture plus the amount of zirconia is, by weight, based on the weight of the coating composition, 1% to 100%; preferably 10% to 100%; more preferably 20% to 100%; more preferably 50% to 100%.

The amount of matrix mixture plus the amount of zirconia plus the amount of solvent is, by weight, based on the weight of the coating composition, preferably 5% to 100%; more preferably 10% to 100%; more preferably 20% to 100%; more preferably 50% to 100%; more preferably 75% to 100%; more preferably 90% to 100%.

Preferably, the zirconia particles are dispersed throughout the composition of the present invention. Mechanical means are optionally employed to enhance thorough dispersion, for example sonication of the composition of the present invention. Individual particles of zirconia are preferably dispersed in the composition of the present invention, with minimal agglomerates of two or more particles. It is contemplated that, the more a dispersion conforms to the preferred number-average diameter and/or the preferred parameters describing the breadth of the particle size distribution that are described above, the more that dispersion will be closer to being free of agglomerates.

A preferred method of using the coating composition of the present invention is to apply a layer of the coating composition onto a substrate. Preferred substrates are synthetic polymers. Preferred substrates are transparent. Preferably, any solvent is removed from the layer of the coating composition; solvent removal may be accomplished by exposing the layer of the coating composition to elevated temperature, for example above 50° C. After solvent removal, the layer of the coating composition is known herein as a coating. Preferably the thickness of the coating is 5 μm or more; more preferably 10 μm or more. Preferably the thickness of the coating is 150 μm or less; more preferably 100 μm or less.

Preferred coatings contain one or more photoinitiators. Preferably such coatings are exposed to radiation that causes the photoinitiator to initiate polymerization in the coating. Preferred radiation is ultraviolet. Preferably, polymerization proceeds in the coating until the amount of residual monomer is, by weight based on the weight of the original matrix mixture, 10% or less; more preferably 3% or less; more preferably 1% or less. Preferably, after the polymerization occurs, the coating is in the form of a continuous solid matrix in which zirconia particles are dispersed, and the solid matrix contains polymer formed by polymerization of the monomers that were present in the matrix mixture.

The following are examples of the present invention. Procedures were conducted at room temperature (approximately 23° C.) unless otherwise stated.

The following abbreviations are used herein:
MIBK=methyl isobutyl ketone
MEK=methyl ethyl ketone
BzMA=benzyl methacrylate
UM-1=urethane methacrylate, (registry no. 72869-86-4)) has structure IV, where $R^7$ is a 9-carbon branched alkyl group, and $R^8$ and $R^9$ are both —$CH_2CH_2$—, and n-1.
TMPTA=trimethylolpropane triacrylate
PETA=pentaerythritol triacrylate
HDDA=1,6-hexanediol diacrylate
TPGDA=tripropylene glycol diacrylate
IBOA=isobornyl acrylate
POSS=polyhedral oligomeric silsequioxane. POSS has a cage structure $R_xT_x$, where R is an organic group on each corner and T is the silsequinoxane linkage, which has the formula $SiO_{1.5}$.
A-POSS=POSS with two or more pendant acrylate groups.
HAN=heavy alkylate naptha (registry no. 75851-65-7)
HMPP=2-hydroxy-2-methyl-1-phenyl-1-propanone, also known as 2-hydroxy-2-methyl propiophenone (registry no. 7473-98-5)
INIT-2=Irgacure™ 2022 initiator, from BASF, a blend of HMPP, 2,4,6-trimethylbenzoylphenylphosphinic acid ethyl ester, and phosphine oxide, phenylbis(2,4,6-trimethylbenzoyl)-
BzP=benzophenone Mat-1=Product HC-5619 mixture of acrylates from Addison Clear Wave, having composition is as follows:

| Ingredient | weight % |
|---|---|
| UM1 | 20 to 50 |
| PETA | 5 to 10 |
| TMPTA | 20 to 50 |
| HAN | 0.2 to 1.0 |
| HMPP | 5 to 15 |

OLIG-1=urethane oligomer with acrylate functionality, product CN-9030 from Sartomer
PGMEA=propylene glycol monomethyl ether acetate
TEM=transmission electron microscopy
Zr-1=surface-modified zirconia particles in PGMEA. Prior to use, the PGMEA was removed by evaporation at temperature above 23° C. under pressure less than 1 atmosphere. Zr-1 was analyzed by TEM and image analysis. Number-average particle diameter was 5.21 nm, N75 was 5.98 nm, and N25 was 4.29 nm. The compound that modifies the surface of the zirconia particle is bonded to the surface of the zirconia by a group that contains a silicon atom, and the compound that modifies the surface of the zirconia particle contains one or more —($CH_2O$)— groups and also contains one or more methacrylate group.
Al-1=Alumina particles, "Aluminum Oxide Nanopowder," from US Research Nanomaterials, Inc.
Si-1=Silica particles, "Admanano" particles, from Admatechs, labeled "10 nm" size, N25 was approximately 15 nm, and N75 was approximately 30 nm, supplied dispersed in methyl ethyl ketone (MEK).
PET=polyethylene terephthalate
pbw=parts by weight. PBW shows relative amounts by weight. The pbw values in a single formulation do not necessarily add up to 100.

The coating compositions were made as follows.
Zirconia particle powders were solubilized in 0.5 g of MEK. The nanoparticle solution was sonicated for at least 2 hours to ensure homogeneous nanoparticle dispersion. Matrix mixture was then added to the nanoparticle solution and the mixture was sonicated for 2 hours to generate a homogeneous dispersion.

Coating compositions were coated onto a substrate as follows.
A draw-down bar was used to make a film of thickness approximately 40 μm on a sheet of PET (obtained from DuPont under the trade name Melinex™ 515 sheet); thickness was of thickness 125 μm (5 mil) except for samples used for pencil hardness testing, for which the thickness was 75 μm (3 mil). The coating was then dried at 70° C. under nitrogen flow for 5 minutes in a thermal oven. The dried coating was then photocured twice using a Fusion™ UV system with approximately 300 mJ/cm$^2$ UV dosage under nitrogen flow at curing speed of approximately 9.14 m/min (30 fpm).

Pencil hardness testing was performed according to ASTM D3363, using a coating on PET of thickness 75 μm (3 mil), for various tests using 1.5 kgf, 0.75 kgf, or 0.5 kgf. Hardness ratings are as follows, from softest to hardest: 6B, 5B, 4B, 3B, 2B, B, HB, F, H, 2H, 3H, 4H, 5H, 6H, 7H, 8H, 9H, 10H. Hardness ratings may be non-integers because multiple replicate samples are tested and the average is reported.

Nanoindentation was assessed using a nanoindenter according to ASTM E2546 at 150 nm.

For tensile testing, specimens were prepared by casting a coating on PET film with low surface tension. After UV curing, the coating was peeled from the PET film. Specimens were cut with a puncture mold, length=22.2 mm and width=4.8 mm Crosshead speed was 3 mm/min. Three replicate specimens were tested for each data point; and the average results are reported.

Elastic modulus (E') was assessed by visually determining the linear portion of the stress vs. strain curve from the tensile test, and E' is the slope.

Transparency ("% T") was measured at 600 nm. Light was passed normal to the surface through the substrate and the cured coating, in LAMBDA™ 750 spectrophotometer from Perkin Elmer.

Matrix Mixtures were formulated as follows. The amounts shown are percent by weight based on the weight of the matrix mixture.

TABLE 1

Matrix Mixtures (% by weight)

| No. | Olig-1 | TMPTA | PETA | HDDA | TPGDA | HMPP |
|---|---|---|---|---|---|---|
| MM1 | 75 | 15 | 5 | 0 | 0 | 5 |
| MM2 | 75 | 0 | 0 | 10 | 10 | 5 |
| MM3 | 50 | 33 | 12 | 0 | 0 | 5 |
| MM4 | 90 | 0 | 0 | 0 | 5 | 5 |
| MM5 | 70 | 12.5 | 0 | 0 | 12.5 | 5 |

TABLE 2

Additional Monomer Mixtures (% by weight)

| No. | Olig-1 | TMPTA | HDDA | TPGDA | IBOA | A-POSS | HMPP | INIT-2 |
|---|---|---|---|---|---|---|---|---|
| MM6 | 70 | 0 | 0 | 0 | 15 | 10 | 5 | 0 |
| MM7 | 50 | 0 | 0 | 0 | 35 | 10 | 5 | 0 |
| MM8 | 70 | 12.5 | 0 | 12.5 | 0 | 0 | 0 | 5 |
| MM9 | 50 | 30 | 10 | 5 | 0 | 0 | 5 | 0 |

Examples of Matrix Mixture Compositions were made as follows. Also shown are some test results performed on cured coatings made of matrix mixture alone, with no zirconia. Amounts shown are parts by weight (pbw). PBW amounts show the relative amounts of the ingredients and do not necessarily add up to 100.

TABLE 3

Matrix Mixture Compositions and results

| Example No. | MM type | MM (pbw) | MEK (pbw) | Thickness (μm)[11] | Modulus (GPa)[12] | Elongation (%) | Hardness[1] |
|---|---|---|---|---|---|---|---|
| 1 | MM1 | 80 | 20 | 45 | 0.99 | 5.3 | |
| 2 | MM2 | 80 | 20 | 33 | 0.25 | 26.5 | |
| 3 | MM3 | 80 | 20 | 38 | 1.67 | 2.0 | 4H |
| 4 | MM4 | 80 | 20 | 52 | 0.03 | 73.8 | |
| 5 | MM5 | 80 | 20 | 35 | 0.61 | 14.6 | |
| 6 | MM6 | 80 | 20 | 38 | 0.32 | 33.1 | |
| 7 | MM7 | 80 | 20 | 41 | 1.32 | 6.7 | H |
| 8 | MM8 | 80 | 20 | 45 | 0.76 | 12.1 | H |
| 9 | MM9 | 80 | 20 | 47 | 1.35 | 1.3 | |
| 10 | Mat-1 | 80 | 20 | 30 | 1.5 | 5.0 | 3H |

[1]Pencil Hardness at 0.75 kgf (absent values mean that the sample was not tested)
[11]Approximate film thickness
[12]Elastic Modulus All of the examples listed in table 3 are matrix mixtures that would be suitable for use in the present invention, and all had acceptable test behavior.

Various amounts of zirconia

The following coating compositions were made and tested. Comparative Examples have a suffix "C" in the Example No. Amounts shown are weight %. "opq" means opaque.

TABLE 4

Coating Compositions and results

| Example No. | MM type | MM (%) | MEK (%) | Zir-1 (%) | Indentation[2] (GPa) | Hardness[3] | % T (%) |
|---|---|---|---|---|---|---|---|
| 11C | Mat-1 | 88.9 | 11.1 | 0.0 | 0.53 | 5.2H | 88.8 |
| 12C | Mat-1 | 77.8 | 11.1 | 11.1 | 0.55 | 5.5H | 88.6 |
| 13C | Mat-1 | 66.7 | 11.1 | 22.2 | 0.54 | 5.5H | 88.5 |
| 14 | Mat-1 | 31.1 | 11.1 | 57.8 | 0.58 | 6.2H | 88.1 |
| 15 | Mat-1 | 22.2 | 11.1 | 66.7 | 0.80 | 7.5H | 87.8 |
| 16 | Mat-1 | 13.3 | 11.1 | 75.6 | 0.49 | 4.8H | 86.5 |
| 17C | Mat-1 | 4.4 | 11.1 | 84.4 | 0.38 | 3.7H | opq |

[2]Nanoindentation at 150 nm
[3]Pencil Hardness at 0.75 kgf

Examples 14, 15, and 16 had all of the following desirable characteristics: nanoindentation of 0.4 GPa or above; hardness of 6.0 H or above; and % T of 86% or above.

Comparative coatings with various amounts of alumina.

The following comparative coating compositions were made and tested. Amounts shown are weight %. "opq" means opaque.

The Alumina was Al-1, defined above. The particle size of the alumina was measured by dynamic light scattering and was observed to have multiple peaks in the particle size distribution, at 334 nm, 470 nm, and 993 nm. Amounts shown are weight %.

TABLE 5

Coating Compositions and results

| Example No. | MM type | MM (%) | MEK (%) | Alumina (%) | Indentation[2] (GPa) | Hardness[3] | % T (%) |
|---|---|---|---|---|---|---|---|
| 18C | Mat-1 | 88.9 | 11.1 | 0.0 | 0.54 | 5.2H | 88.8 |
| 19C | Mat-1 | 80.0 | 11.1 | 8.9 | 0.59 | 5.7H | opq |
| 20C | Mat-1 | 71.1 | 11.1 | 17.8 | 0.7 | 7.3H | opq |
| 21C | Mat-1 | 48.9 | 11.1 | 40.0 | 0.9 | 9.0H | opq |

[2]Nanoindentation at 150 nm
[3]Pencil Hardness at 0.5 kgf

All of the comparative examples that contained any alumina were unacceptable because the coating was opaque.

Zirconia-containing coatings using various matrix mixtures

Various coatings were made, as shown in the following table. Each coating had 25 weight percent matrix mixture and 75 weight percent Zr-1. The substrate was PET film of thickness 75 μm (3 mil). Coatings were applied and cured as described above. The results were as follows. "Ex" means "Example"; and "CEx" means "Comparative Example." Amounts shown are weight %.

TABLE 6

Coating Compositions and Results
(25 wt % Matrix Mixture, 75% Zr-1)

| | Ex 22 | Ex 23 | Ex 24 | Ex 25 | CEx 26C |
|---|---|---|---|---|---|
| UM-1 | 70 | 50 | 50 | 35 | 10 |
| TMPTA | 15 | 33 | 22 | 33 | 33 |
| PETA | 5 | 12 | 8 | 12 | 12 |
| TPGDA | 0 | 0 | 0 | 10 | 0 |
| HDDA | 0 | 0 | 0 | 5 | 0 |
| POSS | 5 | 0 | 5 | 0 | 0 |
| IBOA | 0 | 0 | 10 | 0 | 40 |
| HMPP | 5 | 5 | 5 | 5 | 5 |
| Thickness[4] | 55 μm | 60 μm | 52 μm | 61 μm | 48 μm |
| Hardness[5] | 6H | 8H | 4H | 8H | 2H |

Note[4]:
Coating Thickness, approximate
Note[5]:
Pencil Hardness at 0.75 kgf

Comparative Coatings with various amounts of silica.

The following comparative coating compositions were made and tested as described above. The Silica was Si-1, defined above. Substrate was PET of thickness 75 μm (3 mil). Amounts shown are weight %.

TABLE 7

| | | Coating Compositions and results | | | | |
|---|---|---|---|---|---|---|
| Example No. | MM type | MM (%) | MEK (%) | Silica (%) | Thickness (μm)[4] | Hardness[3] |
| 27C | Mat-1 | 100 | 0 | 0.0 | 45 | 5H |
| 28C | Mat-1 | 33.3 | 33.3 | 33.3 | 54 | 6H |
| 29C | Mat-1 | 14.3 | 42.9 | 42.9 | 48 | 4H |

Note
[3]Pencil Hardness at 0.75 kgf
Note
[4]Approximate coating thickness

In Table 7, the results show that coatings using silica have lower hardness than coatings having the same level of zirconia.

Zirconia-containing coatings using Comparative matrix mixtures

Various coatings were made, as shown in the following table. Each coating had 25 weight percent matrix mixture and 75 weight percent Zr-1. The substrate was PET film of thickness 125 μm (5 mil). Coatings were applied as described above. Coatings were cured using six passes at 630 mJ/cm². The results were as follows. "Ex" means "Example"; and "CEx" means "Comparative Example." Amounts shown are weight %.

TABLE 8

| Comparative Coating Compositions and Results (25 wt % Matrix Mixture, 75% Zr-1) | | |
|---|---|---|
| | CEx 30C | CEx 31C |
| BzMA | 60 | 52 |
| TMPTA | 20 | 28 |
| BzP | 20 | 20 |
| Thickness[4] | 54 μm | 65 μm |
| Hardness[5] | F | 2H |

Note[4]:
Coating Thickness, approximate
Note[5]:
Pencil Hardness at 0.75 kgf

The coatings shown in Table 8 are comparative because they do not have urethane (meth)acrylate in the matrix mixture, and they show lower hardness than comparable inventive coatings.

The invention claimed is:

1. A coating composition comprising
  (a) a matrix mixture, wherein said matrix mixture comprises
     (i) 30% to 95% of one or more urethane multi(meth) acrylates, by weight based on the weight of said matrix mixture;
     (ii) 4% to 50% of one or more non-urethane multi (meth)acrylates, by weight based on the weight of said matrix mixture;
     (iii) 0 to 35% of one or more mono(meth)acrylates, by weight based on the weight of said matrix mixture;
     (iv) 1% to 10% of one or more initiators, by weight based on the weight of said matrix mixture;
  (b) zirconia,
     (i) wherein said zirconia is in the form of a collection of zirconia particles having number-average diameter of 100 nm or less;
     (ii) wherein said collection of zirconia particles has a distribution of diameters that has a breadth parameter (BP) defined by $$BP = N75 - N25$$

of 5 nm or less;
     wherein N75 is the diameter such that 75% of the particles, by number of particles, have diameter of N75 or below, while 25% of the particles, by number of particles, have diameter above N75; and
     N25 is the diameter such that 25% of the particles, by number of particles, have diameter of N25 or below, while 75% of the particles, by number of particles, have diameter above N25; and
  wherein the weight ratio of (a) to (b) is from 0.06:1 to 2.8:1, and wherein the amount of (a) plus the amount of (b) is 1% to 100% by weight based on the weight of said coating composition.

2. The coating composition of claim 1 wherein said urethane multi(meth)acrylate comprises a urethane multi (meth)acrylate having exactly two groups of structure II:

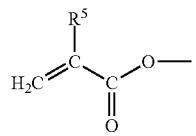

wherein $R^5$ is hydrogen or methyl.

3. The coating composition of claim 1 wherein said non-urethane multi(meth)acrylate comprises a non-urethane multi(meth)acrylate having three or more groups of structure II:

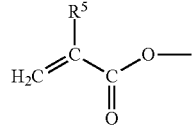

wherein $R^5$ is hydrogen or methyl.

4. The coating composition of claim 1 wherein said mono(meth)acrylate is present in an amount of 0 to 1% by weight, based on the weight of said monomer matrix.

5. The coating composition of claim 1, wherein said collection of zirconia particles has number-average diameter of 20 nm or less.

6. The coating composition of claim 1, wherein said zirconia has surface modification comprising compounds selected from the group consisting of organosiloxanes, organoalcohols, organocarboxylic acids, and mixtures thereof.

7. The coating composition of claim 1, additionally comprising one or more organic solvent.

8. A coated article formed by a process comprising
  (A) applying a layer of the coating composition of claim 7 to a surface of a substrate,
  (B) removing said solvent from said layer of the coating composition of claim 7, and
  (C) curing, or allowing to cure, said layer of the coating composition of claim 7.

* * * * *